United States Patent [19]
Redmond, Jr.

[11] 4,066,732
[45] Jan. 3, 1978

[54] TOOTHED BELT MAKING

[75] Inventor: John D. Redmond, Jr., Denver, Colo.

[73] Assignee: The Gates Rubber Company, Denver, Colo.

[21] Appl. No.: 743,433

[22] Filed: Nov. 19, 1976

[51] Int. Cl.² ............................................. B29D 29/00
[52] U.S. Cl. .................................... 264/229; 156/138; 156/139; 156/140; 264/230; 264/250; 264/275
[58] Field of Search ............... 264/229, 230, 250, 265, 264/278; 156/137, 138, 139, 140

[56] References Cited

U.S. PATENT DOCUMENTS

| 3,138,962 | 6/1964 | Haines | 156/138 X |
| 3,418,186 | 12/1968 | Wetzel | 156/140 |
| 3,580,767 | 5/1971 | Barnes | 156/138 |
| 3,897,291 | 7/1975 | Hoback | 264/250 X |
| 3,964,328 | 6/1976 | Redmond | 156/139 X |

Primary Examiner—Richard R. Kucia
Attorney, Agent, or Firm—Curtis H. Castleman, Jr.; Raymond Fink; H. W. Oberg, Jr.

[57] ABSTRACT

A method of making toothed power transmission belting having preferably an elastomer-free sprocket-engaging toothed surface is described. A temperature sensitive tackifier is applied to a toothed mold surface and the belt face cover is stitched to the tacky surface, and then preferably further immobilized by winding tensile cord circumferentially about the mold. Elastomeric material is introduced into the tooth and body portions of the belt and the belting is cured. The temperature is elevated at some point during the process, whereby the tackifier loses its adherence to the mold, permitting easy demolding of the product.

11 Claims, 7 Drawing Figures

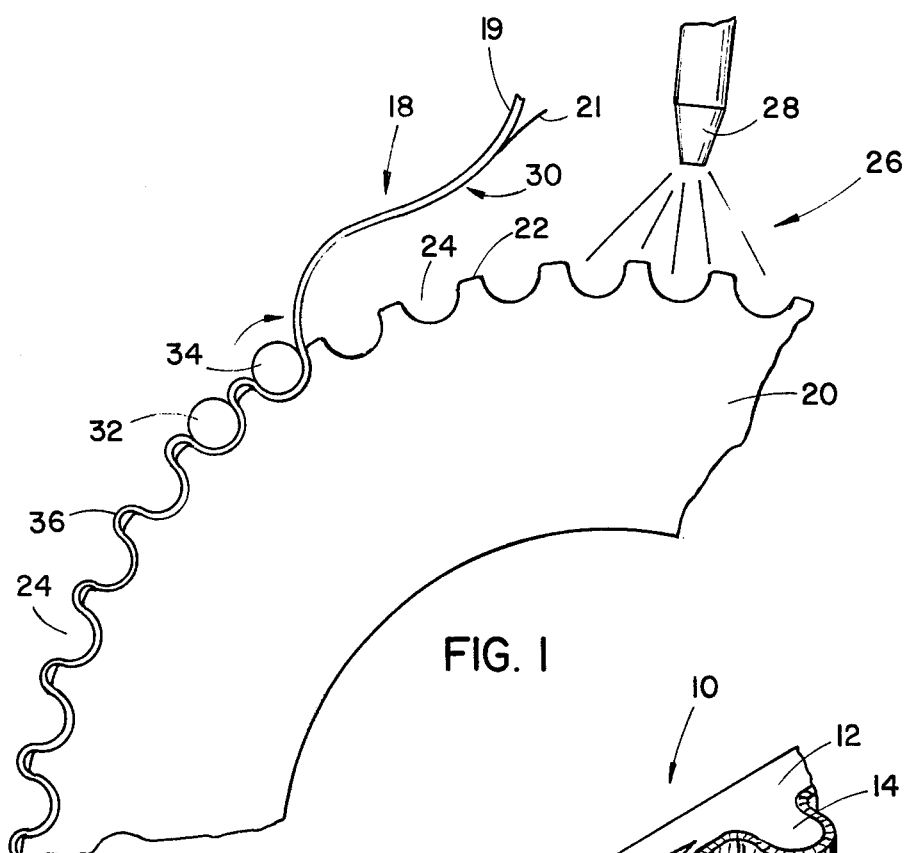
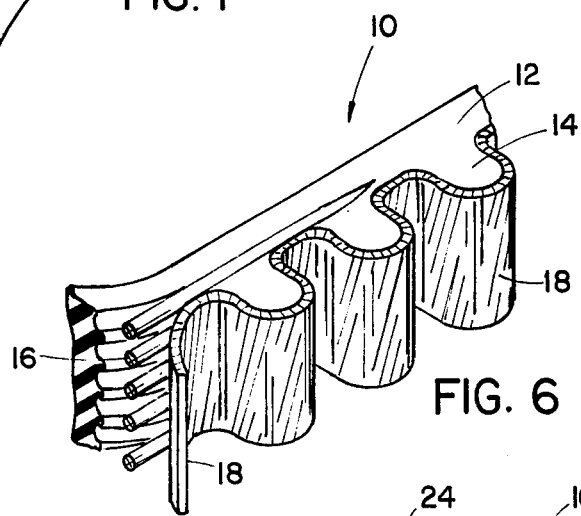
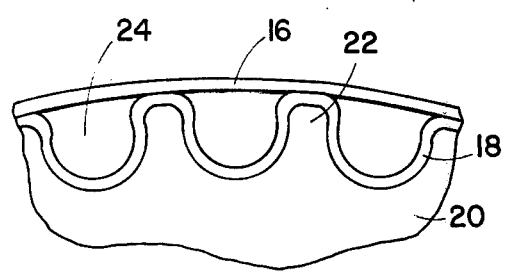
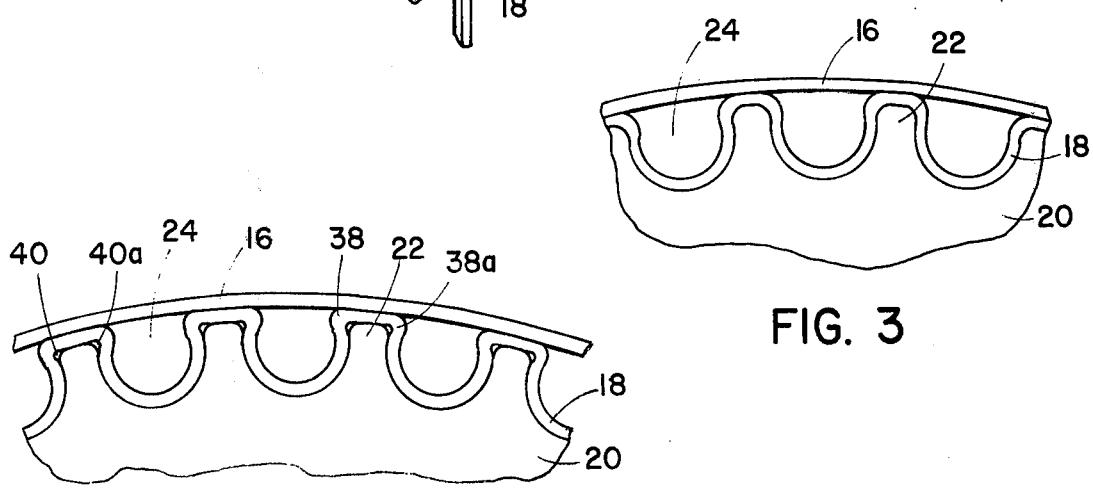

TOOTHED BELT MAKING

BACKGROUND OF THE INVENTION

This invention relates to the production of power transmission belting having teeth positioned along the driving surface of the belt, and more particularly to a positive method of affixing a face cover to the surface of the teeth and to insure that the inner driving surface of the belt conforms to the profile of the mold and is preferably substantially free of the elastomer which forms the body of the belt.

The advantages of providing the driving surface of endless power transmission belting with an elastomer-free fabric driving surface, especially with respect to a positive drive cast belt, is described in U.S. Pat. No. 3,964,328 to Redmond, Jr. The prominent advantages of liquid-cast belts, e.g., of urethane, are noise and heat reduction, and longer life. In that patent, a method is described for obtaining such a power transmission belt having an elastomer-free driving surface, utilizing a layer of elastomer impervious material which is bonded to one side of a wear-resistant fabric layer, and which acts as a dam against encroachment of liquid elastomer to the driving surface of the belt during the casting procedure.

The present invention is primarily drawn to a method of intimately conforming a face cover, which may consist of the fabric/elastomer impervious material laminate taught in the Redmond, Jr., U.S. Pat. No. 3,964,328, into the notches of a toothed mold. In this manner, the elastomeric material during the casting or molding operation is substantially precluded from encroaching into the space between the face cover and notched surface of the mold mandrel.

Additional prior art which may be relevant includes U.S. Pat. No. 3,138,962 to Haines, Jr., et al, U.S. Pat. No. 3,772,929 to Redmond, Jr., and Belgium Patent No. 718,148.

Summary of the Invention

Briefly described, a method of affixing the face cover to the surface of the teeth of the belt is described including the steps of: (1) applying a temperature sensitive tackifier, adherable to the face cover at the joining temperature under step (2), below, and separable with respect to the face cover at temperatures elevated a predetermined amount above the joining temperature, directly or indirectly to the surface of a toothed mold; (2) stitchingly joining the face cover and conforming it to the surface of the toothed mold; (3) positoning a tensile band generally transversely to the disposition of the teeth of the mold and adjacent the face cover to substantially immobilize the face cover against the notches defined between the teeth of the mold (optional step); (4) disposing elastomeric material against the face cover and within the notches between the teeth of the mold, and embedding the tensile band (if present) in elastomeric material; (5) elevating the temperature of the mold, either prior to or after step (6), at least said predetermined amount above the joining temperature whereby the tackifier loses its tackiness and the face cover becomes readily movable with respect to the mold; and (6) curing the belt.

BRIEF DESCRIPTION OF THE DRAWINGS

Preferred aspects of this invention will be described with reference to the accompanying drawings, in which like numerals designate like parts in the several figures, and wherein:

FIG. 1 is a fragmentary end view of a mold mandrel to which is being applied the face cover member for the belting;

FIG. 2 is a fragmentary view similar to FIG. 1 also showing a tensile band wrapped about the face cover and mold;

FIG. 3 is similar to FIG. 2 and shows an alternative intermediate configuration;

FIG. 6 is a perspective view of a segment of an endless toothed belt, shown partially separated into its component parts.

PREFERRED EMBODIMENTS OF THE INVENTION

Figure 4:
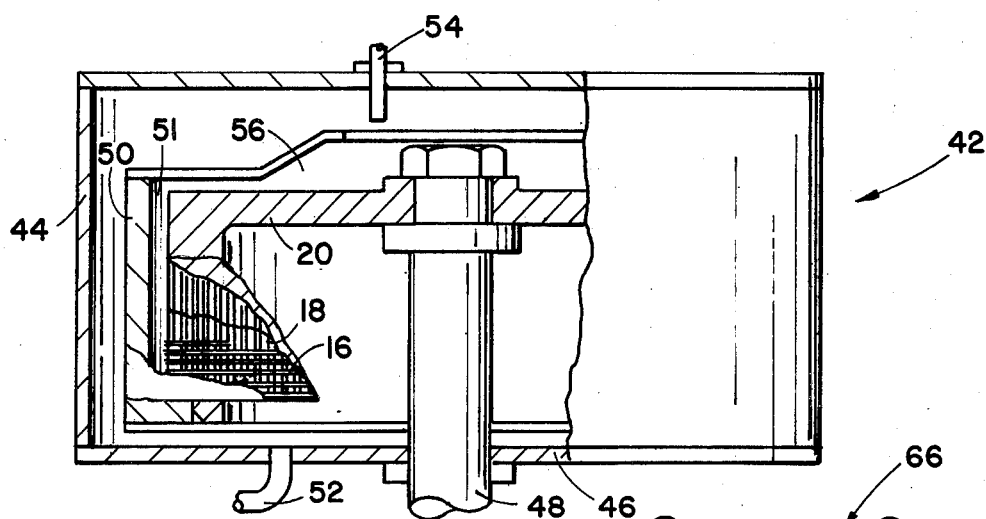
FIG. 4 depictss mold apparatus for manufacturing one type of belt according to the invention.

Preferred aspects of the invention will be described in relation to the manufacture of a positive drive liquid-cast elastomeric belt. The invention is not so limited, and, for instance, is also applicable to traditional molded elastomeric positive drive belts, or side drive type having notched undercord forming the toothed drive surface. The particular shape of the teeth is also not critical and, in addition to being generally semi-circular as shown n the drawings, may be trapezoidal, curvilinear generally, or of the configuration shown in U.S. Pat. No. 3,977,265 to Worley et al, for instance.

Referring first to FIG. 6, a typical belt made according to the method of the invention is shown generally at 10 and includes an elastomeric body 12, with a plurality of elastomeric spaced teeth 14 disposed along the inner driving surface of the belt and integral with the body portion. Embedded in the belt are tensile cords 16, which may be spaced apart or tightly compacted. A face cover 18 is positioned along the outermost sprocket-engaging surface of the teeth presenting a sprocket-engaging surface which is substantially free of the elastomeric material of the body and/or teeth. The face cover material will normally be much less aggressive when driven in a cooperating sprocket, as it has generally a significantly lower coefficient of friction than the elastomer within the belt.

To produce the belt of FIG. 6 according to the invention, reference is first made to FIG. 1. In the initial step, a mold mandrel 20 is provided having a series of lands 22 and alternating notches or depressioms 24 extending along the circumference of the mold and generally parallel to the axis thereof. To conform the face cover 18 intimately along the surface of the notches of the mold mandrel in accordance with the invention, and to insure adherence of the face cover to such notched surface, in advance of the face cover is supplied to the notched mold surface a temperature or heat sensitive tackifying agent 26. The tackifier is shown applied to the mold surface as a spray from nozzle 28; alternatively the tackifier may be applied indirectly to the surface of the toothed mold by application to the underside 30 of the face cover, and then be transferred to the mold surface during the stitching operation to be described hereafter. Clearly, the tackifier may also be applied directly to each of the toothed mold and the undersurface of the face cover. While spraying has been shown, any other suitable application technique may be employed, such as brushing or dipping, for instance.

After the tackifier has been appropriately applied, the face cover is brought into conformance, in an adhering manner, with the succesive notches of the mold surface by a stitching operation using stitching means such as dowels 32, 34. The stitching means should be so configured that upon pressing the face cover against the sticky mold surface there is provided a substantially void-free interface therebetween. The stitching operation may be accomplished automatically or, as shown, manually by pressing in the first dowel stitcher 32, and while maintaining dowel 32 in its notch, pressing in dowel 34 in the next successive notch, preferably using a slight clockwise rolling movement. To fill the next successive notch, the trailing dowel 32 is then released from its associated notch and pushed into the next succeeding notch ahead of dowel 34 with the face cover being thereby pushed into place. This operation is continued until the entire circumferential mold surface is filled with the face cover member, and the ends spliced in a suitable manner.

Because the tackifier is preferably chosen to be highly adherable to the face cover at the temperature at which the face cover is joined to the toothed mandrel, the stitching dowels may be removed without breaking the bond between the face cover and mold.

In the embodiment shown in FIGS. 1 and 2, employing a heat shrinkable face cover, allowance is made for shrinkage of the face cover material at the apex of each of the lands 22, by providing a slight loop 36 at each such location. This loop allows for controlled shrinkage of the face cover durig subsequent operations while ensuring continued face cover conformance along the notched portions of the mold.

The face cover is made of a web of material of multiple layers of material which will satisfactorily bond to the elastomer of the belt teeth 14, and which preferably presents a barrier or dam to preclude intrusion of such elastomeric material to the outermost surface 30 of the face cover. In a preferred embodiment, as taught more fully in the previously mentioned Redmond, Jr., U.S. Pat. No. 3,964,328, the face cover 18 is composed of a wear-resistant reinforcing fabric 19 sealed with an outer layer of elastomer-impervious material 21, bonded together such that the elastomer-impervious material penetrates into the interstices of the fabric. The fabric 19 may be of any desired configuration such as a conventional weave consisting of warp or weft threads at any desired angle, or may consist of warp threads held together by spaced pick cords, of a knitted or braided configuration, and the like. More than one ply of fabric may be employed. If desired, the fabric may be cut on a bias so that the strands form an angle with the direction of travel of the belt in use. Conventional fabrics may be employed using such materials as cotton, polyester, polyamide, hemp, jute, fiber glass, aramid, and various other natural and synthetic fibers. In a preferred embodiment, the fabric layer 19 consists of an expansible (and heatshrinkable) wear-resistant fabric in which at least one of the warp or weft threads is nylon.

The layer of elastomer-impervious material 21, and its method of attachment to the wear-resistant fabric, is more fully taught in the Redmond, Jr., U.S. Pat. No. 3,964,328, hereby incorporated by reference, but preferably is a film or layer of polymeric material which may or may not wear off during use of the belt. A suitable material is polyethylene film.

The use of the temperature sensitive tackifier is critical to the method invention. It is fully adherable to and bonds the mold surface and face cover at the temperature at which the two are joined, e.g., ambient or room temperature, but loses its tack permitting the face cover and mold to be readily movable or releasable from one another at specified temperatures elevated a predetermined amount above the temperature at which the face cover and toothed mold are joined.

This predetermined elevated temperature at which the tackifier loses its tack may be selected according to the desired processing conditions. Preferably, at a minimum, the bond between the face cover and mold remains at least through the preferred step of positioning the tensile band 16 circumferentially about the mold (oriented generally longitudinally with respect to the intended direction of travel of the belt during use). The tensile band, which is merely optionally employed, may be any customary material providing strength longitudinally of the belt, and may be in the form of helically wound cord members, as shown in the drawings, or may alternatively be in the configuration of a fabric, tire cord, dispersed fiber loading, or simple continuous band or layer. Customarily the tensile members may consist of one or more strands or a conventional stress-resistant material such as polyamide cord, fiber glass, polyester cord, aramid cord or wire filaments.

As will be seen from FIG. 2, the tensile band, when helically wound about the mold under tension, depresses the loops 36 to form side protuberations 38, 38a, and interfacial voids 40, 40a. These protruberations in essence provide slack in the situation where the face cover 18 has a tendency to heat shrink, and in this manner it is always ensured that the face cover will conform to the shape of the notches. The stickiness of the tackifier will also ensure this conformance.

The tackifier is temperature sensitive and preferably comprises in addition to a solvent phase a thermoplastic polymeric phase. Dependng upon the flash point of the solvent, the tackiness of the tackifier may be controlled by heating, e.g, by flashing off solvent to cause the tackifier to lose adherability.

In a preferred embodiment, the wrapped mold in the configuration of FIG. 2 is submitted to a pre-heat step, for instance at temperatures in the range from about 140° to about 250°, more preferably from about 160° to about 200° F., for a time period from about 15 minutes to about 2 hours and more preferably from about 30 minutes to about 45 minutes, depending partially on the heat conductivity of the mold, and in general for a time sufficient to cause the protuberations 38, 38a to contract and intimately follow the shape of the lands 22 of the mold, as shown in FIG. 3. At this point, depending upon the particular solvent and polymeric content of the tackifier, the bond between the face cover and mold may be no longer effective, however, the wound tensile band 16 immobilizes the face cover and maintains it in conformance with the mold notches. Alternatively, the melt point of the tackifier can be so chosen that there is still a bond between the face cover and mold after this alternative pre-heating step.

In a preferred embodiment in the production of a liquid-cast sleeve of belting, the mold apparatus of FIG. 4 may be employed. A preferred general technique for producing such belts is described in U.S. Patent No. 3,138,962 to Haines et al and 3,200,180 to Russ et al. As shown in FIG. 4, a casting assembly 42 broadly comprises an outer vacuum chamber 44, a platform 46 upon which the vacuum chamber rests, a central rotatable shaft 48 extending from the outside of the vaccum chamber through the platform into the chamber upon which is supported mold mandrel 20 with the face cover and tensile members in the position shown in FIG. 3. The mold mandrel 20 together with outer mold shell 50 and define an annular cavity 51 where the liquid casting elastomeric material is directed. Preparatory to casting, the vacuum chamber is evacuated by an exhaust line 52, which is connected to a vacuum pump (not shown). Liquid casting materials are introduced by means of an entry port 54 which is directed toward space 56 connected to annulus 51. As the assembly is rotated about the shaft 48, the liquid elastomer is forced to the outer regions and into the annulus 51 by means of centrifugal force, and in this manner completely fills the depressions 24 in the mold to form teeth 14 of the final belt, and also fully embed tensile member 16 to form an outer elastomeric body layer for the belt.

Various types of elastomeric materials are available which may be cast using the aforementioned apparatus. Included are curable liquid elastomers exemplified by plastisols, organosols, liquid chloroprenes, liquid polysulfides, liquid rubbers, silicones, epoxides, urethanes, carboxylated butadieneacrylonitrile, polyester based resins, polyether based resins, and the like. Polyurethane elastomers are generally preferred at present because of their tensile strength, abrasion resistance and satisfactory modulus and elasticity. Such polyurethanes may be prepared in conventional manner, such as by compounding a urethane prepolymer (formed by a reaction of an active hydrogen-containing compound with a polyisocyanate) with a curing agent and an amount of plasticizer or other ingredient, if desired. Conventional curing agents may be utilized, such as organohydrogen-containing compounds exemplified by substituted aromatic amines.

During the liquid casting operation, the temperature of the mold may be brought to within the range from about 140° to about 200° and more preferably from about 160° to about 185° F. In one preferred embodiment of the invention, the tackifier at this point is still effective to at least partially bond the face cover intimately to the surface of the notches of the mold mandrel. Subsequent to casting, as is known, the temperature is further elevated to cure the elastomeric material, completing the cross-linking thermosetting reaction. In one preferred embodiment, subsequent to casting, but prior to achieving maximum curing temperature, the tackifier loses its tack and permits the face cover to become readily movable or slidable with respect to the mold.

Figure 5:
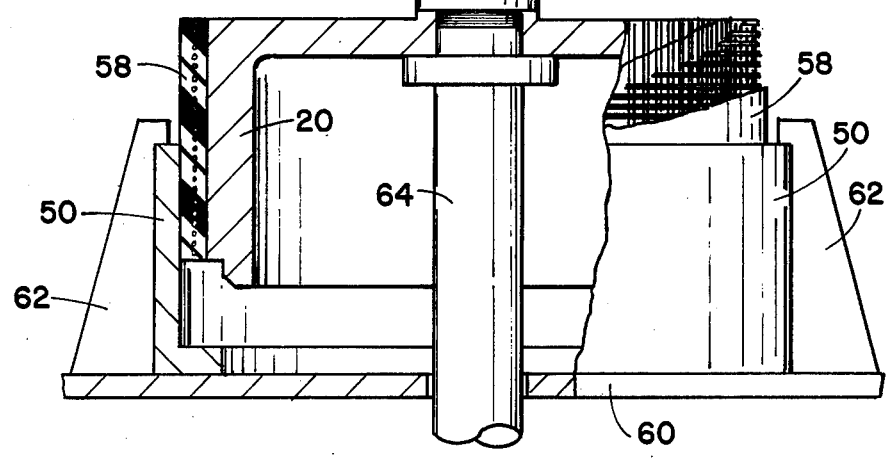
FIGS. 5 and 7 depict apparatus used in demolding the product.
Figure 7:
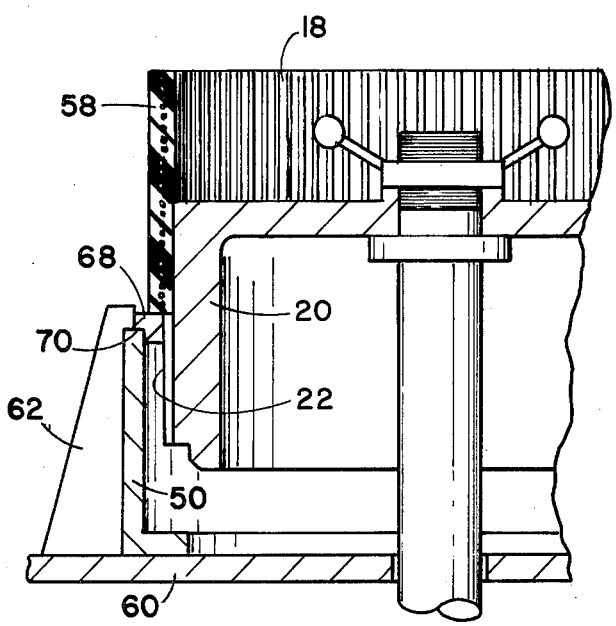

The advantage of the relative mobility between the face cover and mold is articularly advantageous during the demolding step, shown in FIGS. 5 and 7. The hot mold with the cured sleeve of belting 58 is transferred from the casting and curing apparatus of FIG. 4 to a demolding station. To demold according to FIG. 5, the entire mold with product is disposed within the demolding apparatus shown, which includes support 60, a plurality of shouldered plates 62 fitting over the top edge of the mold shell 50, and an axially movable, hydraulically operated, ram 64 detachably fixed to the mold mandrel 20 with the threaded fastening arrangement shown at 66. After loading the mold in the apparatus, the ram 64 is actuated to gradually move upwardly (shown at an intermediate position in FIG. 5), and finally fully extended above the mold shell 50. At this point split collar 68 is positioned over the leading edge 70 of the mold shell wall 50, and the ram 64 actuated to withdraw in a downward direction so that the bottom of the belt sleeve product 58 abuts on the top of the collar 68. Further withdrawal of the ram 64 downwardly causes the belt sleeve 58 to be stripped from the mandrel 20, shown in process in FIG. 7.

The ease with which the product slides relative to the mold surface during demolding is a direct result of the tackifying agent having been elevated in temperature to lose its adhesive or tack quality in accordance with the invention. The temperature at the mandrel/belt sleeve interface at which demolding is effected is above the critical temperature at which the tackifier loses its bonding capability.

As a final step, the sleeve of belting 58 may be square cut into individual endless belts of the type shown in FIG. 6, or profiled to form trapezoidal V-belts, as is well known in the art.

Alternatively, the belting may be formed in a conventional molding operation utilizing traditional moldable elastomeric materials, such as various natural and synthetic rubbers, or moldable plastics. In such cases, the preform configuration of FIG. 3 may be utilized employing lateral spacing between individual tensile cords 16, and a layer or rubber built-up on top of such tensile band. Thereafter, heat and compression may be employed to press the rubber through the interstices between tensile members and force it down into the notch depressions 24 and then against the face cover 18 to form a bond therewith. In such cases, per the invention, the face cover is at all times substantially in intimate conforming fit with the surface of the mold 20. As another alternative, rubber material may be preformed or loaded into the cavities 24, then the tensile cord is helically wound about the mold, and finally further rubber and/or reinforcement is plied up as a top or overcord layer. The application of the method of the subject invention to the manufacture of rubber belting of toothed configuration will be apparent to the skilled artisan after having read the present specification.

The tackifying agent is capable of providing a number of functions in addition to enabling conforming the face cover to the notched mold surface. As has been seen, it also functions as a mold release agent at the elevated temperatures associated with molding and demolding, and also preferably acts as a satisfactory mold lubricant so that no additional mold lubricant need be employed. It has also been found that residual amounts of tackifying agent adhered to the belt will wear off rapidly during use.

In general, it is preferred that the tackifier comprise a thermoplastic polymeric material or materials dispersed or dissolved in a suitable carrier solvent phase. In one embodiment, the thermoplastic component provides the key to the operation of the tackifying agent of the invention by being primarily solid to provide tackiness at a lower temperature (for adhering the face cover to the notched mold surface) and in free flowable liquid form at a predetermined higher temperature which either significantly reduces or totally eliminates the adhesive quality of the tackifying agent. The melting point of the thermoplastic normally determines the transition between solid and liquid states, and therefore will determine the tackifying transition point for any particular desired application.

In one illustrative example, which has been found suitable in the manufacture of urethane positive drive belts, the tackifier includes a thermoplastic phase comprised of a mixture of polyvinyl acetate, a turpene pinewood resin and smaller proportions of styrene, the latter component permitting tack release at high temperatures. The carrier solvent in this particular example is a mixture of methylene chloride and toluene. It is believed that the toluene combines with the thermoplastic phase to provide tack, as well as solubilizing the polyvinyl acetate. A specific tackifier in aerosol form which has been found useful in the production of polyurethane belts according to the subject invention is marketed under the name "Zip-Stik", (John Crane Corporation). This particular material will provide tack after drying at room temperature for from about 2 to about 10 minutes. Upon further drying (after mutually joining the face cover and mold together), the tackifier loses its tack, but the bond remains. The material also goes through a second tacky state at an elevated temperature because of the melting point of the thermoplastic, according to the invention. It will be appreciated by those skilled in the art that various other tackifiers and components may be employed which will provide the desired temperature release properties as required.

It should be understood that the invention is capable of a variety of modifications and variations which will become apparent to those skilled in the art upon a reading of this specification. Such modifications and variations and equivalents are intended to be a part of the scope of the invention as defined by the appended claims.

What is claimed is:

1. In the manufacture of power transmission belting having an elastomeric body and spaced teeth disposed along the inner surface thereof, the teeth including an outermost face cover portion, a method of affixing the face cover into intimate conformance to the surface of the teeth, comprising the steps of:
    a. applying a temperature sensitive tackifier, adherable to the face cover at the joining temperature under step b) and separable with respect to the face cover at a temperature elevated a predetermined amount above the joining temperature, directly or indirectly to the surface of a notched mold;
    b. stitchingly joining the face cover into conformance with the notched surface of the mold;
    c. disposing elastomeric material against the face cover and within the notches of the mold;
    d. elevating the temperature of the tackifier, either prior to or after step e), at least said predetermined amount above the joining temperature whereby the tackifier loses its tackiness and the face cover becomes readily movable with respect to the mold; and
    e. curing the belting.

2. The method of claim 1 wherein the tackifier comprises a thermoplastic polymeric material having a melting point above the joining temperature under step b).

3. The method of claim 2 wherein the tackifier is disposed in a carrier solvent.

4. The method of claim 1 wherein the face cover is formed of a heat shrinkable material, and is joined to the surface of the notched mold in such a manner that excess face cover material is provided notches in the form of loops.

5. The method of claim 1 wherein step c) is accomplished by casting a liquid elastomeric within an annular cavity defined between the mold, wrapped with face cover, and an outwardly disposed mold shell spaced uniformly from the tensile band.

6. The method of claim 1 including the additional step, after step b) and prior to step c), of: positioning a tensile band generally transversely to the disposition of the notches of the mold and adjacent the face cover to substantially immobilize the face cover against the notches.

7. The method of claim 6 wherein subsequent to the step of positioning the tensile band but prior to step c), the perform comprising face cover and adjacently disposed tensile band are heated sufficiently to shrink the excess face cover material and conform it intimately against the land portions of the mold defined between the notches.

8. In a method of making toothed elastomeric power transmission belting having a body and teeth attached thereto and having a face cover formed on the outer surface of the teeth, the steps comprising: adhering the face cover to a notched mold surface with a temperature sensitive tackifier; applying a tensile member outwardly of the face cover and generally transversely of the notches of the mold; elevating the temperature of the tackifier sufficiently to break adherence between the face cover and notched mold surface; introducing elastomeric material into the mold and curing the belting into a unitary member.

9. The method of claim 8 wherein the tackifier maintains tack and adheres the face cover and notched mold surface together through the step of introduction of elastomeric material, and yet loses tack at an elevated temperature which is below the temperature at which the belting is cured.

10. A method for manufacturing toothed elastomeric power transmission belting having a body and teeth attached thereto, and having a face cover formed on the outer surface of the teeth and substantially free of the elastomer, comprising: bonding the face cover temporarily to a notched mold surface with a temperature sensitive tackifier; elevating the temperature of the tackifier, sufficiently to cause the bond between the face cover and notched mold surface to be at least partially broken; introducing elastomeric material into the notches of the mold and curing the belting into a unitary member.

11. The method of claim 10 wherein the tackifier comprises a thermoplastic polymeric material dispersed in a solvent phase, and the bond between the face cover and mold is broken by heating the tackifier to cause solvent to flash off thereby reducing the tackiness of the tackifier.

* * * * *

UNITED STATES PATENT OFFICE
CERTIFICATE OF CORRECTION

PATENT NO. : 4,066,732
DATED : January 3, 1978
INVENTOR(S) : John D. Redmond, Jr.

It is certified that error appears in the above-identified patent and that said Letters Patent are hereby corrected as shown below:

Column 8, line 2, after "provided" insert -- between --

Column 8, line 17, second word "perform" should be -- preform -- .

Signed and Sealed this

Nineteenth Day of December 1978

[SEAL]

Attest:

RUTH C. MASON
Attesting Officer

DONALD W. BANNER
Commissioner of Patents and Trademarks